United States Patent
Terushita et al.

(10) Patent No.: US 8,601,960 B2
(45) Date of Patent: Dec. 10, 2013

(54) METHOD AND APPARATUS OF CONTROLLING EXHAUST GAS IN OXYFUEL COMBUSTION BOILER

(75) Inventors: Shuuhei Terushita, Tokyo (JP); Toshihiko Yamada, Tokyo (JP); Shuzo Watanabe, Tokyo (JP); Terutoshi Uchida, Tokyo (JP)

(73) Assignees: IHI Corporation, Tokyo (JP); Electric Power Development Co., Ltd., Tokyo (JP)

( * ) Notice: Subject to any disclaimer, the term of this patent is extended or adjusted under 35 U.S.C. 154(b) by 441 days.

(21) Appl. No.: 12/920,738

(22) PCT Filed: Mar. 6, 2008

(86) PCT No.: PCT/JP2008/000475
§ 371 (c)(1),
(2), (4) Date: Dec. 15, 2010

(87) PCT Pub. No.: WO2009/110037
PCT Pub. Date: Sep. 11, 2009

(65) Prior Publication Data
US 2011/0132243 A1    Jun. 9, 2011

(51) Int. Cl.
*F23J 11/00* (2006.01)
*F23B 70/00* (2006.01)
*F23B 80/02* (2006.01)
*F23C 9/00* (2006.01)
*F23L 9/00* (2006.01)

(52) U.S. Cl.
USPC ............ 110/345; 110/205; 110/204; 110/348

(58) Field of Classification Search
USPC ............ 110/204, 345, 203, 344, 205; 431/10
See application file for complete search history.

(56) References Cited

U.S. PATENT DOCUMENTS 6,935,251 B2  8/2005 Marin et al.
2004/0074427 A1  4/2004 Kobayashi et al.
(Continued)

FOREIGN PATENT DOCUMENTS

EP   1 698 827 A2   9/2006
JP   59 42452       3/1984
(Continued)

OTHER PUBLICATIONS

The Extended European Search Report issued May 15, 2012, in Application No. 08720361.8-1266 / 2251599 PCT/JP2008000475.

(Continued)

*Primary Examiner* — Kenneth Rinehart
*Assistant Examiner* — Tavia Sullens
(74) *Attorney, Agent, or Firm* — Oblon, Spivak, McClelland, Maier & Neustadt, L.L.P.

(57) ABSTRACT

In an apparatus of controlling an exhaust gas in an oxyfuel combustion boiler having the boiler 4 provided with burners 6 and a two-stage combustion port 7, a primary recirculation line 12 through which pulverized coal obtained by a mill 3 is fed to the burners 6 of the boiler 4 by the primary recirculating exhaust gas, a secondary recirculation line 14 through which another portion of the exhaust gas in recirculation is fed to a wind box 5 of the boiler 4, an oxygen producer 23, a direct supply line 25 through which a portion of oxygen produced by the oxygen producer 23 is directly fed to the burner 6 and a secondary oxygen mixing line 24 through which another portion of oxygen produced by the oxygen producer 23 is fed to the secondary recirculation line 14, the apparatus comprises an oxygen supply line 26 through which oxygen is fed to the two-stage combustion port of the boiler 4 and a flow rate regulator 20, 27 in the oxygen supply line for adjusting oxygen density.

4 Claims, 4 Drawing Sheets

(56) References Cited

U.S. PATENT DOCUMENTS

| | | |
|---|---|---|
| 2004/0237909 A1 | 12/2004 | Krebs |
| 2006/0196400 A1 | 9/2006 | Martin et al. |
| 2007/0215022 A1 | 9/2007 | Kobayashi et al. |
| 2008/0286707 A1* | 11/2008 | Panesar et al. ............ 431/10 |
| 2009/0031933 A1 | 2/2009 | Ookawa et al. |
| 2009/0272300 A1 | 11/2009 | Yamada et al. |

FOREIGN PATENT DOCUMENTS

| | | |
|---|---|---|
| JP | 4-244504 A | 9/1992 |
| JP | 5 26409 | 2/1993 |
| JP | 5-26409 | 2/1993 |
| JP | 5-168853 A | 7/1993 |
| JP | 5-172305 A | 7/1993 |
| JP | 5-231609 A | 9/1993 |
| JP | 6 101809 | 4/1994 |
| JP | 7-318016 A | 12/1995 |
| JP | 62 192044 | 12/1997 |
| JP | 2001-235103 A | 8/2001 |
| JP | 2001-336736 A | 12/2001 |
| JP | 2007-147162 A | 6/2007 |
| WO | WO 2007/061106 A1 | 5/2007 |

OTHER PUBLICATIONS

R. Dunker, "Brennertechnik mit neuem Freiheitsgrad", BWK Brennstoff Warme Kraft, Springer VDI Verlag, vol. 59, No. 3, XP001504848, Jan. 1, 2007, pp. 51-54.

Karl Mieske, et al., "Experimentelle Untersuchung der Schadstofentstehung bei der Verbrennung im Oxyfuel-Prozess", 23. Deutscher Flammentag, retrieved from the Internet: URL:http://www.adecos.de/download/publikationen/081014_kwatkoll_tuhh_mieske.pdf, XP002674659, Sep. 13, 2007, 12 pages.

\* cited by examiner

METHOD AND APPARATUS OF CONTROLLING EXHAUST GAS IN OXYFUEL COMBUSTION BOILER

TECHNICAL FIELD

The present invention relates to a method and an apparatus of controlling an exhaust gas in an oxyfuel combustion boiler.

BACKGROUND ART

An increased carbon dioxide ($CO_2$) density in the atmosphere has proved to be one of major factors of global warming which has recently come into attention as a global-scale environmental problem. A thermal power plant appears close-up as a fixed source exhausting these substances. The fuel for the thermal power generation can be oil, natural gas and coal, among which coal is especially anticipated to have a large future demand due to its greater potential reserves.

Coal contains a higher percentage of carbon as compared with natural gas and oil, together with other elements such as hydrogen, nitrogen and sulfur, and ash as an inorganic element. Therefore, when coal is burned in the air, most of the composition of the combustion exhaust gas is occupied by nitrogen (about 70%), with the remainder occupied by carbon dioxide $CO_2$, sulfur oxide $SO_X$, nitrogen oxide $NO_X$, oxygen (about 4%) and other gases, and particles such as unburned coal and ash. The exhaust gas is thus subjected to exhaust gas treatments such as denitration, desulfurization and dedusting so that $NO_X$, $SO_X$ and particulates fall under their respective environmental emission standard values before the emission to the atmosphere through a stack.

$NO_X$ in the exhaust gas divides into a thermal $NO_X$ generated from oxidization of nitrogen in the air by oxygen and a fuel $NO_X$ generated as a result of oxidization of nitrogen in the fuel. Up until now, a combustion method of lowering the flame temperature has been employed for reduction of the thermal $NO_X$ whereas another combustion method of forming a fuel-excess region deoxidizing $NO_X$ within a burner has been employed for reduction of the fuel $NO_X$.

In case of using a fuel containing sulfur such as coal, a wet or a dry desulfurizing device has been provided to remove $SO_X$ generated in the exhaust gas as a result of the combustion.

It is desired on the other hand that a large amount of carbon dioxide generated in the exhaust gas be separated and removed with high efficiency. A possible method of capturing carbon dioxide contained in the exhaust gas has hitherto been reviewed that includes a method of causing an amine or other absorbing liquid to absorb it, an adsorption method of causing a solid adsorbent to adsorb it or a membrane separation method, all of which have a low conversion efficiency, thus not yet reaching a practical use level of the $CO_2$ capture from a coal burning boiler.

Accordingly, a combustion technology of a fuel with oxygen instead of air has been proposed as an effective manner to address at one time both the problem of the separation of carbon dioxide in the exhaust gas and the problem of the suppression of the thermal $NO_X$ (see, e.g., Patent Literatures 1 to 4).

When coal is burned with oxygen, generation of the thermal $NO_X$ is not seen and most of the exhaust gas is occupied by carbon dioxide with the remainder occupied by other gases containing the fuel $NO_X$, $SO_X$ and unburned combustibles, consequently achieving a relatively easy liquefaction and separation of the carbon dioxide through cooling of the exhaust gas.

Description will be made of a construction of an air combustion boiler. The boiler construction is of various types, one of which has burners arranged in plural rows laterally of the furnace and arranged in plural stages vertically, and a two-stage combustion port (so-called OAP (Over Air Port)) disposed at given locations above the corresponding burners in rows so that two-stage combustion is carried out by two-stage combustion air blown out from the two-stage combustion ports.

[Patent Literature 1] JP 5-231609A
[Patent Literature 2] JP 2001-235103A
[Patent Literature 3] JP 5-168853A
[Patent Literature 4] JP 2007-147162A

SUMMARY OF INVENTION

Technical Problems

The standard boiler or the two-stage combustion boiler has posed a problem that it may be difficult to control the amount of $NO_X$ and unburned combustibles such as CO in the exhaust gas emitted from the boiler. Varying the air mass flow ratio has also hitherto been reviewed to control the amount of $NO_X$ and unburned combustibles such as CO in the exhaust gas, resulting in unsatisfactory control thereof.

The invention was made in view of the above and has its object to provide a method and an apparatus of controlling an exhaust gas in an oxyfuel combustion boiler to control the amount of $NO_X$ and unburned combustibles in the exhaust gas emitted from the boiler.

Solution to Problems

The invention is directed to a method of controlling an exhaust gas in an oxyfuel combustion boiler with said boiler provided with burners and a two-stage combustion port, a primary recirculation line through which a portion of the exhaust gas in recirculation emitted from the boiler is fed as primary recirculating exhaust gas to a mill and pulverized coal obtained by the mill is fed to the burners of the boiler by said primary recirculating exhaust gas, a secondary recirculation line through which another portion of the exhaust gas in recirculation is fed to a wind box of the boiler, an oxygen producer, a direct supply line through which a portion of oxygen produced by the oxygen producer is directly fed to the burners and a secondary oxygen mixing line through which another portion of oxygen produced by the oxygen producer is fed to said secondary recirculation line, the method comprising feeding oxygen to the two-stage combustion port of the boiler to adjust oxygen density.

In the method of controlling the exhaust gas in the oxyfuel combustion boiler, it is preferable that, when the entire $NO_X$ density is to be lowered with the amount of unburned combustibles in the exhaust gas being allowable, adjustment is made toward increasing the amount of the recirculating exhaust gas fed to the two-stage combustion port to thereby reduce the density of oxygen to the two-stage combustion port whereas when the entire heat absorption of the boiler is to be raised or when the amount of the unburned combustibles in the entire exhaust gas is to be reduced, adjustment is made toward decreasing the amount of the recirculating exhaust gas fed to the two-stage combustion port to thereby increase the density of oxygen to the two-stage combustion port.

In the method of controlling the exhaust gas in the oxyfuel combustion boiler, it is preferable that the oxygen density is adjusted for each of a plurality of two-stage combustion ports arranged on the boiler.

In the method of controlling the exhaust gas in the oxyfuel combustion boiler, it is preferable that a portion of the exhaust gas fed through the secondary recirculation line is fed to the two-stage combustion port of the boiler.

The invention is directed to an apparatus of controlling an exhaust gas in an oxyfuel combustion boiler, the apparatus having said boiler provided with burners and a two-stage combustion port, a primary recirculation line through which a portion of the exhaust gas in recirculation emitted from the boiler is fed as primary recirculating exhaust gas to a mill and pulverized coal obtained by the mill is fed to the burners of the boiler by said primary recirculating exhaust gas, a secondary recirculation line through which another portion of the exhaust gas in recirculation is fed to a wind box of the boiler, an oxygen producer, a direct supply line through which a portion of oxygen produced by the oxygen producer is directly fed to the burners and a secondary oxygen mixing line through which another portion of oxygen produced by the oxygen producer is fed to said secondary recirculation line, the apparatus comprising an oxygen supply line through which oxygen is fed to the two-stage combustion port of the boiler and a flow rate regulator in the oxygen supply line for adjusting oxygen density.

In the apparatus of controlling the exhaust gas in the oxyfuel combustion boiler, it is preferable that, when the entire $NO_X$ density is to be lowered with the amount of unburned combustibles in the exhaust gas being allowable, adjustment is made toward increasing the amount of the recirculating exhaust gas fed to the two-stage combustion port by means of a flow rate regulator to thereby reduce the density of oxygen to the two-stage combustion port, whereas when the entire heat absorption of the boiler is to be raised or when the amount of the unburned combustibles in the entire exhaust gas is to be reduced, adjustment is made toward decreasing the amount of the recirculating exhaust gas fed to the two-stage combustion port by means of the flow rate regulator to thereby increase the density of oxygen to the two-stage combustion port.

In the apparatus of controlling the exhaust gas in the oxyfuel combustion boiler, it is preferable that the apparatus comprises a plurality of two-stage combustion ports arranged on the boiler and a plurality of branched oxygen supply lines for regulating the oxygen density for each of the two-stage combustion ports.

In the apparatus of controlling the exhaust gas in the oxyfuel combustion boiler, it is preferable that the apparatus comprises a tertiary recirculation line through which a portion of the exhaust gas fed through the secondary recirculation line is fed to the two-stage combustion port of the boiler.

Advantageous Effects of Invention

According to a method and an apparatus of controlling an exhaust gas in an oxyfuel combustion boiler having burners and two-stage combustion ports of the invention, there can be obtained an excellent effect of enabling control of the $NO_X$ density in the exhaust gas and the amount of unburned combustibles in the exhaust gas by adjusting the oxygen density through feed of oxygen from two-stage combustion port.

Figure 1:
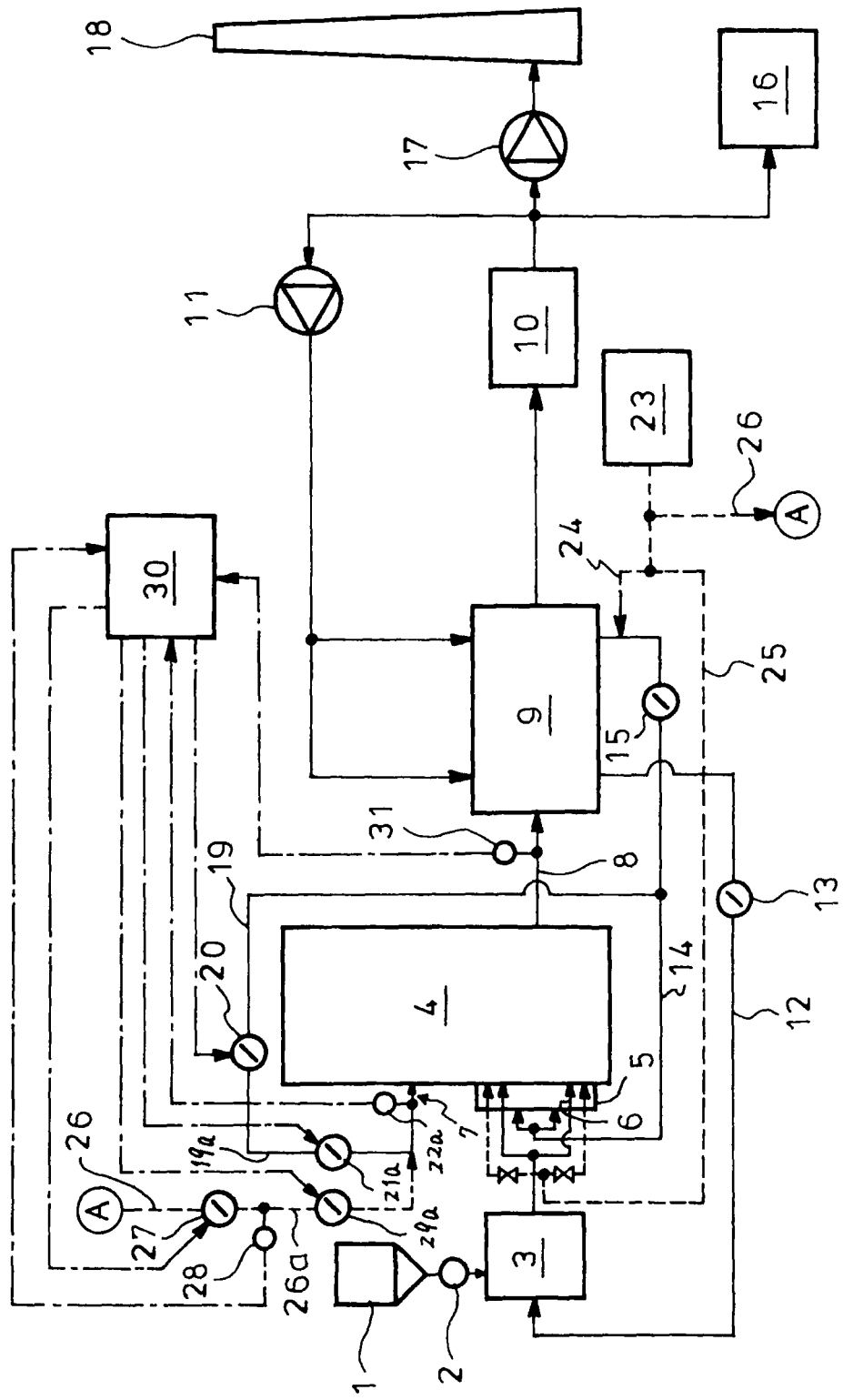
FIG. 1 is a general schematic construction diagram of an embodiment of the invention.
Figure 2:
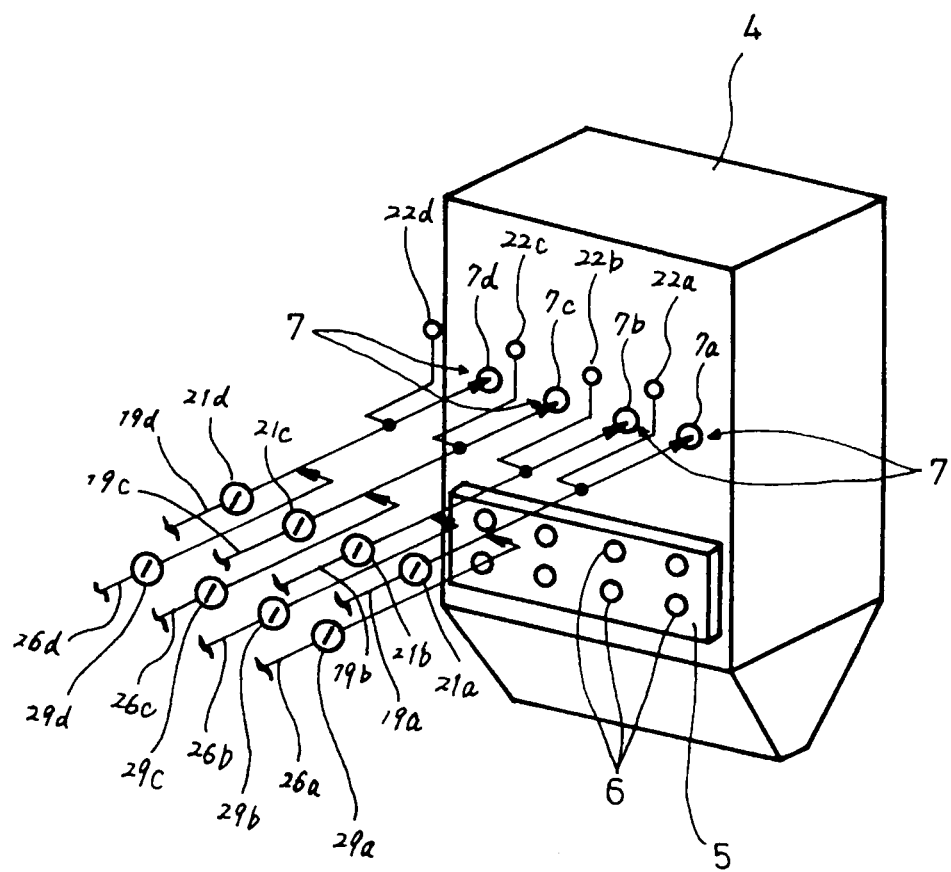
FIG. 2 is a conceptual diagram of a tertiary recirculation line and an oxygen supply line connected to a two-stage port of an oxyfuel combustion boiler.
Figure 3:
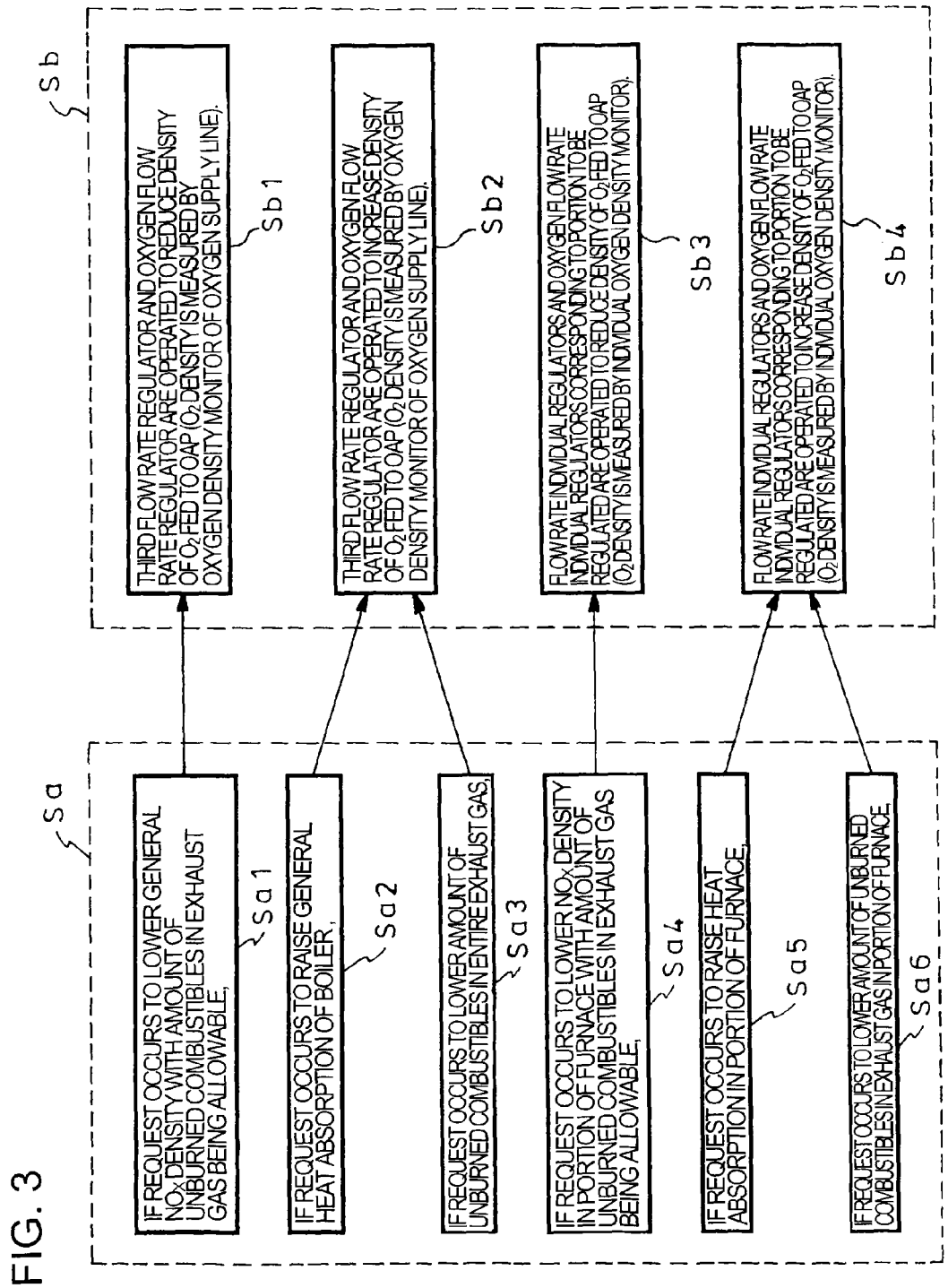
FIG. 3 is a flowchart of a flow of control in the embodiment of the invention.

REFERENCE SIGNS LIST 3 mill
4 boiler
5 wind box
6 burner
7 two-stage combustion port
9 air preheater
10 exhaust gas treating device
12 primary recirculation line
14 secondary recirculation line
19 tertiary recirculation line
20 third flow rate regulator (flow rate regulator)
23 oxygen producer
24 secondary oxygen mixing line
25 direct supply line
26 oxygen supply line
26a first branched oxygen supply line
26b second branched oxygen supply line
26c third branched oxygen supply line
26d fourth branched oxygen supply line
27 oxygen flow rate regulator (flow rate regulator)
28 oxygen density monitor

DESCRIPTION OF EMBODIMENT

An embodiment of the invention will now be described with reference to the accompanying drawings.

Referring to FIGS. 1 to 4 depicting the embodiment of the invention, reference numeral 1 denotes a coal bunker for coal storage; 2, a coal feeder for feeding coal stored in the bunker 1; 3, a mill for pulverizing and drying coal fed from the feeder 2; 4, an oxyfuel boiler; 5, a wind box fitted to the boiler 4; 6, burners disposed in the wind box 5 for burning pulverized coal from the mill 3; 7, a two-stage combustion port (so-called an OAP (Over Air Port) disposed at a given location above the burners 6 in the boiler 4; 8, an exhaust gas line through which flows an exhaust gas emitted from the boiler 4; 9, an air preheater for heat exchange of the exhaust gas flowing through the exhaust gas line 8 with primary and secondary recirculating exhaust gases; 10, an exhaust gas treating device such as a desulfurizer and a dust collector for the treatment of the exhaust gas passing through the air preheater 9; 11, a forced draft fan (FDF) for forcedly sending an exhaust gas purified by the exhaust gas treating device 10 as primary and secondary recirculating exhaust gases; 12, a primary recirculation line for leading as primary recirculating exhaust gas a portion of the exhaust gas forcedly sent by the forced draft fan 11 through the air preheater 9 for preheating to the mill 3; 13, a first flow rate regulator for regulating a flow rate of the primary recirculating exhaust gas; 14 denotes a secondary recirculation line for leading as secondary recirculating exhaust gas another portion of the exhaust gas forcedly sent by the forced draft fan 11 through the air preheater 9 for preheating to the wind box 5; 15, a second flow rate regulator for regulating a flow rate of the secondary recirculating exhaust gas; 16, a capture device for capturing $CO_2$, etc., through taking in the exhaust gas purified by the exhaust gas treating device 10; 17, an induced draft fan (IDF) disposed downstream of the exhaust gas treating device 10 for inducedly sucking down the exhaust gas; and 18, a stack through which discharged to the atmosphere is the exhaust gas purified by the exhaust gas treating device 10 to be induced by the induced draft fan 17.

In this embodiment, the boiler 4 has the burners 6 arranged in plural rows (four rows in FIG. 2) laterally of the furnace and arranged in plural stages (two stages in FIG. 2) vertically, with the two-stage combustion port 7 of the boiler 4 disposed above the corresponding burners 6 in rows to form a first port 7a, a second port 7b, a third port 7c and a fourth port 7d.

The secondary recirculation line 14 is provided with a tertiary recirculation line 19 branching therefrom between the second flow rate regulator 15 and the wind box 5 to feed the two-stage port 7 with a portion of the exhaust gas. The tertiary recirculation line 19 branches at its halfway point into a first branched recirculation line 19a, a second branched recirculation line 19b, a third branched recirculation line 19c and a fourth branched recirculation line 19d so as to correspond respectively to the first port 7a, the second port 7b, the third port 7c and the fourth port 7d. The arrangement of the two-stage combustion port 7 is not limited to the four rows, but instead any plural rows are available. If the two-stage port 7 is arranged in other plural rows, then a corresponding number of branched recirculation lines are provided correspondingly to the plural rows. In FIG. 1, the branched recirculation lines 19a, 19b, 19c and 19d are represented by reference numeral 19a.

The tertiary recirculation line 19 is provided with a third flow rate regulator 20 between a point branching from the secondary recirculation line 14 and points branching into the branched recirculation lines 19a, 19b, 19c and 19d. The first branched recirculating circuit 19a, the second branched recirculating circuit 19b, the third branched recirculating circuit 19c and the fourth branched recirculating circuit 19d are provided respectively with flow rate individual regulators 21a, 21b, 21c, and 21d and with individual oxygen density monitors 22a, 22b, 22c and 22d. In FIG. 1, the flow rate individual regulators 21a, 21b, 21c and 21d are represented by reference numeral 21a, and the respective oxygen density monitors 22a, 22b, 22c and 22d are represented by reference numeral 22a.

The general construction includes an oxygen producer 23 for producing oxygen through taking in the air and a secondary oxygen mixing line 24 for feeding a portion of oxygen produced by the oxygen producer 23 as secondary oxygen to the secondary recirculation line 14. An oxygen flow rate regulator (not shown) is disposed in the secondary oxygen mixing line 24. Although in the shown embodiment the secondary oxygen is exemplarily fed to the secondary recirculating circuit 14 downstream of the air preheater 9, it may be fed upstream of the air preheater 9.

The general construction includes a direct supply line 25 directly feeding another portion of oxygen produced by the oxygen producer 23 as a direct fed oxygen to the burners 6, the direct supply line 25 being provided with a direct feed amount regulator (not shown).

The general construction further includes an oxygen supply line 26 branching from a point upstream of the point branching into the secondary oxygen mixing line 24 and the direct supply line 25 for feeding the remainder of oxygen produced by the oxygen producer 23 to the two-stage combustion port 7. The oxygen supply line 26 branches at its halfway point into a first branched oxygen supply line 26a, a second branched oxygen supply line 26b, a third branched oxygen supply line 26c and a fourth branched oxygen supply line 26d which in turn connects respectively to the first branched recirculation line 19a, the second branched recirculation line 19b, the third branched recirculation line 19c and the fourth branched recirculation line 19d. The oxygen supply line 26 is provided at its upstream side with a general oxygen flow rate regulator 27 and at its downstream side with a general oxygen density monitor 28. Oxygen flow rate individual regulators 29a, 29b, 29c and 29d are disposed respectively on the first branched oxygen supply line 26a, the second branched oxygen supply line 26b, the third branched oxygen supply line 26c and the fourth branched oxygen supply line 26d. In FIG. 1, the oxygen supply line 26 connects at A's. The branched oxygen supply lines 26a, 26b, 26c and 26d are represented by reference numeral 26a, and the oxygen flow rate individual regulators 29a, 29b, 29c and 29d are represented by reference numeral 29a.

A control unit 30 is provided which is connected to all of the third flow rate regulator 20 of the tertiary recirculation line 19, the flow rate individual regulator 21a of the first branched recirculation line 19a, the flow rate individual regulator 21b of the second branched recirculation line 19b, the flow rate individual regulator 21c of the third branched recirculation line 19c and the flow rate individual regulator 21d of the fourth branched recirculation line 19d, and to all of the general oxygen flow rate regulator 27 of the oxygen supply line 26, the oxygen flow rate individual regulator 29a of the first branched oxygen supply line 26a, the oxygen flow rate individual regulator 29b of the second branched oxygen supply line 26b, the oxygen flow rate individual regulator 29c of the third branched oxygen supply line 26c and the oxygen flow rate individual regulator 29d of the fourth branched oxygen supply line 26d. The control unit 30 is provided with processing means Sa and Sb so as to control the regulators 20, 21a to 21d, 27 and 29a to 29d on the basis of signals from a $NO_X$ density monitor 31 disposed on the exhaust gas line 8 between the boiler 4 and the air preheater 9, the oxygen density monitor 28 of the oxygen supply line 26, the individual oxygen density monitor 22a of the first branched recirculation line 19a, the individual oxygen density monitor 22b of the second branched recirculation line 19b, the individual oxygen density monitor 22c of the third branched recirculation line 19c, the individual oxygen density monitor 22d of the fourth branched recirculation line 19d, etc. It is to be understood that the signals input to the control unit 30 are not particularly limitative but may be replaced by any other data as long as the regulators 20, 21a to 21d, 27 and 29a to 29d are controlled depending on the status of the boiler 4.

Next, operations of the illustrated embodiment will be described.

In the boiler 4, coal stored in the coal bunker 1 is fed by the coal feeder 2 to the mill 3 where coal is pulverized into pulverized coal while simultaneously the primary recirculating exhaust gas, which is a portion of the exhaust gas derived downstream of the exhaust gas treating device 10 by the forced draft fan (FDF) 11, is introduced through the primary recirculation line 12 into the mill 3 to dry the coal fed thereto, the resultant dried pulverized coal being then transferred to the burners 6 of the boiler 4.

On the other hand, another portion of the exhaust gas from the forced draft fan 11 is fed as the secondary recirculating exhaust gas through the secondary recirculation line 14 into the wind box 5 of the boiler 4, while simultaneously a portion of the secondary recirculating gas (exhaust gas) fed via the secondary recirculation line 14 is fed through the tertiary recirculation line 19 and the branched recirculation lines 19a, 19b, 19c and 19d to the two-stage combustion port 7 of the boiler 4.

A portion of oxygen produced by the oxygen producer 23 is fed through the secondary oxygen mixing line 24 into the secondary recirculation line 14 while simultaneously another portion of oxygen from the oxygen producer 23 is directly fed through the direct supply line 25 to the burners 6, with the remainder of oxygen from the oxygen producer 23 being fed via the oxygen supply line 26 and the respective branched oxygen supply lines 26a, 26b, 26c and 26d through the corresponding branched recirculation lines 19a, 19b, 19c and 19d, respectively. In this case, oxygen fed via the oxygen supply line 26, etc., to the two-stage combustion port 7 may be supplied together with the exhaust gas or may be directly supplied without being mixed with the exhaust gas.

Thus, the pulverized coal fed from the mill 3 to the burners 6 by the primary recirculating exhaust gas is burned by the secondary recirculating gas fed to the wind box 5 with oxygen mixed therewith, direct feed oxygen fed directly to the burners 6 and exhaust gas fed to the two-stage combustion port 7 with oxygen mixed therewith. The exhaust gas generated as a result of the combustion preheats the primary and secondary recirculating exhaust gases via the air preheater 9 and then is treated by the exhaust gas treating device 10, after which a part thereof is led to the forced draft fan 11 and the capture device 16, with the remainder thereof being induced by the induced draft fan (IDF) for the emission to the atmosphere through the stack 18. The capture device 16 captures $CO_2$, etc., from the exhaust gas captured therein.

Since the state of the combustion of the boiler 4 changes depending on various conditions, the control means Sa of the control unit 30 collects data from the $NO_X$ density monitor 31, the oxygen density monitor 28 of the oxygen supply line 26 and the individual oxygen density monitors 22a, 22b, 22c and 22d of the respective branched recirculation lines 19a, 19b, 19c and 19d so as to regulate the $NO_X$ density, the amount of unburned combustibles such as CO in the exhaust gas and the furnace heat absorption based on the state of the combustion. At the same time, the control means Sa determines the combustion state of the boiler 4 including operator's requirements, etc., so that the control means Sb of the control unit 30 controls the amount of oxygen fed to the two-stage combustion port 7 through adjusting the third flow rate regulator 20 of the tertiary recirculation line 19, the flow rate individual regulators 21a, 21b, 21c and 21d of the respective branched recirculation lines, the general oxygen flow rate regulator 27 of the oxygen supply line 26 and the oxygen flow rate individual regulators 29a, 29b, 29c and 29d of the respective branched oxygen supply lines 26a, 26b, 26c and 26d.

More specifically, if a request occurs to lower the general $NO_X$ density with the amount of the unburned combustibles in the exhaust gas being allowable (step Sa1), then while making a measurement by the oxygen density monitor 28 of the oxygen supply line 26, the third flow rate regulator 20 and the oxygen flow rate regulator 27 are operated to reduce the amount of oxygen fed to the two-stage combustion port 7 (step Sb1) to thereby reduce the oxygen density to lower the general $NO_X$ density. If a request occurs to raise the general heat absorption of the boiler 4 (step Sa2) or if a request occurs to lower the discharge amount of the unburned combustibles in the entire exhaust gas (step Sa3), then while making a measurement by the oxygen density monitor 28 of the oxygen supply line 26, the third flow rate regulator 20 and the oxygen flow rate regulator 27 are operated to increase the amount of oxygen fed to the two-stage combustion port 7 (step Sb2) to thereby increase the oxygen density to raise the general heat adsorption of the boiler 4 or to lower the discharge amount of the unburned combustibles in the entire exhaust gas.

If a request occurs to lower the $NO_X$ density in a portion (esp., laterally) of the furnace of the boiler 4 with the amount of the unburned combustibles in the exhaust gas being allowable (step Sa4), then while making measurements by the oxygen density monitors 22a, 22b, 22c and 22d of the respective branched oxygen supply lines 26a, 26b, 26c and 26d, the corresponding flow rate individual regulators 21a, 21b, 21c and 21d and the respective oxygen flow rate individual regulators 29a, 29b, 29c and 29d are operated to reduce the amount of oxygen fed to the port unit of the two-stage combustion port 7 (step Sb3) to thereby reduce the oxygen density to lower the $NO_X$ density in the portion (esp., laterally) of the furnace of the boiler 4. Furthermore, if a request occurs to raise the heat absorption in a portion of the furnace of the boiler 4 (step Sa5) or if a request occurs to lower the discharge amount of the unburned combustibles in the exhaust gas in a portion of the furnace (step Sa6), then while making measurements by the oxygen density monitors 22a, 22b, 22c, and 22d of the respective branched oxygen supply lines 26a, 26b, 26c and 26d, the corresponding flow rate individual regulators 21a, 21b, 21c and 21d and the respective oxygen flow rate individual regulators 29a, 29b, 29c and 29d are operated to increase the amount of oxygen fed to the two-stage combustion port 7 (step Sb4) to thereby increase the oxygen density to raise the heat absorption in the portion of the boiler 4 or to lower the discharge amount of the unburned combustibles in the exhaust gas in the portion of the furnace of the boiler 4.

Figure 4:
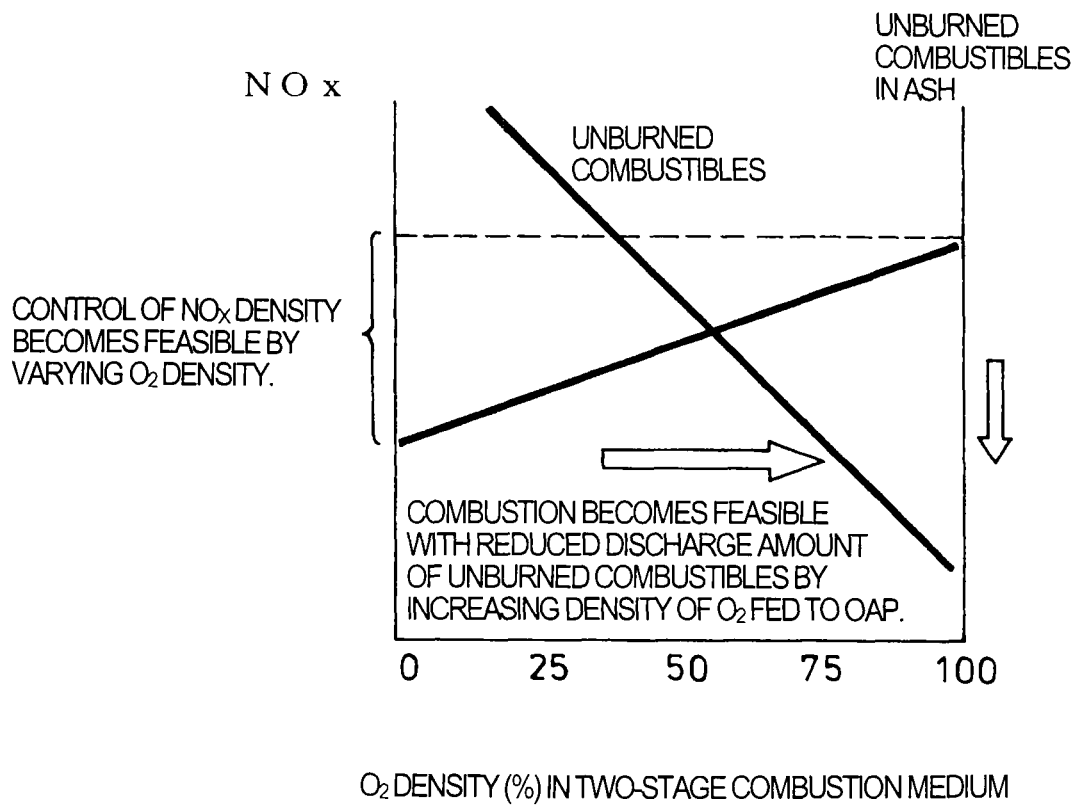
FIG. 4 is a graph of an operational range in the embodiment of the invention.

The inventors have acquired test results as shown in FIG. 4 when adjusting the density of oxygen fed to the two-stage combustion port 7 in a test boiler where pulverized coal is burned in oxygen. As seen in FIG. 4, it has become apparent that control of the $NO_X$ density becomes feasible to reduce the $NO_X$ density when the density of oxygen to the two-stage combustion port 7 is lowered and that the combustion becomes feasible with reduced discharge amount of the unburned combustibles in the exhaust gas when the density of oxygen to the two-stage combustion port 7 is raised.

Thus, in the boiler 4 where the burners 6 and the two-stage combustion port 7 are arranged, oxygen is fed from the two-stage combustion port 7 to adjust the oxygen density, thereby enabling the $NO_X$ density in the exhaust gas, the discharge amount of the unburned combustibles in the exhaust gas and the heat absorption in the furnace to be controlled.

In the embodiment, when the entire $NO_X$ density is to be lowered with the amount of the unburned combustibles in the exhaust gas being allowable, adjustment is made toward increasing the amount of the recirculating exhaust gas fed to the two-stage combustion port 7 by means of the flow rate regulators to thereby reduce the density of oxygen to the two-stage combustion port 7 whereas when the entire heat absorption of the boiler 4 is to be raised or when the amount of the unburned combustibles in the entire exhaust gas is to be reduced, adjustment is made toward decreasing the amount of the recirculating exhaust gas to the two-stage combustion port 7 by means of the flow rate regulators to thereby increase the density of oxygen to the two-stage combustion port 7. Such configuration enables an accurate adjustment of the oxygen density through feeding the oxygen from the two-stage combustion port 7, thus providing a favorable control of the $NO_X$ density in the exhaust gas, the discharge amount of the unburned combustibles in the exhaust gas and the heat absorption in the furnace.

Furthermore, in the embodiment, the boiler 4 may be provided with a plurality of two-stage combustion ports 7 and with a plurality of branched oxygen supply lines 26a, 26b, 26c, and 26d to allow the oxygen density to be adjusted for each of the two-stage combustion ports 7, whereby correspondingly to a case where the $NO_X$ density is to be lowered in a portion of the furnace of the boiler 4, a case where the heat absorption is to be raised in a portion of the furnace of the boiler 4 or a case where the discharge amount of the unburned combustibles in the exhaust gas is to be reduced in a portion of the furnace, oxygen can be fed through the respective branched oxygen supply lines 26a, 26b, 26c and 26d to accurately control their respective oxygen densities, thus providing a further favorable control of the $NO_X$ density in the exhaust gas, the discharge amount of the unburned combustibles in the exhaust gas and the heat absorption in the furnace.

By virtue of the provision of the tertiary recirculation line 19 feeding the two-stage combustion ports 7 of the boiler 4 with a portion of the exhaust gas fed through the secondary recirculation line 14, the oxygen density can be adjusted through easy control of the feed of oxygen to the two-stage combustion ports 7, thus providing a simple and accurate control of the $NO_X$ density in the exhaust gas, the discharge amount of the unburned combustibles in the exhaust gas and the heat absorption in the furnace.

It is to be understood that a method and an apparatus of controlling an exhaust gas in an oxyfuel combustion boiler according to the invention is not limited to the above embodiment and that various changes and modifications may be made without departing from the scope of the invention. For example,

The invention claimed is:

1. A method of controlling an exhaust gas in an oxyfuel combustion boiler system including:
    a boiler comprising a plurality of burners and a two-stage combustion port forming a plurality of ports to correspond to the plurality of burners;
    a primary recirculation line through which a portion of the exhaust gas in recirculation emitted from the boiler is fed as primary recirculating exhaust gas to a mill and pulverized coal obtained by the mill is fed to the burners of the boiler by said primary recirculating exhaust gas;
    a secondary recirculation line through which another portion of the exhaust gas in recirculation is fed as secondary recirculating exhaust gas to a wind box of the boiler;
    an oxygen producer;
    a direct supply line through which a portion of oxygen produced by the oxygen producer is directly fed to the burners;
    a secondary oxygen mixing line through which another portion of oxygen produced by the oxygen producer is fed to said secondary recirculation line;
    a tertiary recirculation line branching from the secondary recirculation line between a flow rate regulator on the secondary recirculation line and the wind box into a plurality of branched recirculation lines to feed the plurality of the ports of said two-stage combustion port with a portion of the recirculating exhaust gas;
    a flow rate regulator arranged on the tertiary recirculation line;
    a flow rate individual regulator arranged on each of said branched recirculation lines;
    an oxygen supply line branching from a point upstream of the point branching into the secondary oxygen mixing line and the direct supply line into a plurality of branched oxygen supply lines to feed the plurality of the ports of said two-stage combustion port with oxygen;
    an oxygen flow rate regulator arranged on said oxygen supply line to regulate a flow rate;
    oxygen flow rate individual regulators arranged on said branched oxygen supply lines to regulate a flow rate; and
    a control unit to collect data of oxygen densities of said oxygen supply line and said branched recirculation lines and regulate the flow rate regulator on the tertiary recirculation line, the flow rate individual regulators, the oxygen flow rate regulator and the oxygen flow rate individual regulators,
    the method comprising:
    controlling the flow rate regulator on the tertiary recirculation line, the flow rate individual regulators, the oxygen flow rate regulator and the oxygen flow rate individual regulators by said control unit to feed oxygen to the plurality of ports of the two-stage combustion port of the boiler to thereby adjust oxygen density therein;
    measuring $NO_x$ density of the boiler to adjust toward increasing an amount of the exhaust gas fed to the two-stage combustion port to thereby reduce an oxygen density to the two-stage combustion port when an entire $NO_x$ density is to be lowered with an amount of unburned combustibles in the exhaust gas allowable; and
    controlling heat absorption of the boiler to adjust toward decreasing the amount of the exhaust gas fed to the two-stage combustion port to thereby increase the oxygen density to the two-stage combustion port when entire heat absorption of the boiler is to be raised or when the amount of the unburned combustibles in all of the exhaust gas is to be reduced.

2. The method of claim 1, wherein the oxygen density is adjusted for each of a plurality of two-stage combustion ports arranged on the boiler.

3. An apparatus comprising:
    a boiler comprising a plurality of burners and a two-stage combustion port forming a plurality of ports to correspond to the plurality of burners;
    a primary recirculation line through which a portion of the exhaust gas in recirculation emitted from the boiler is fed as primary recirculating exhaust gas to a mill and pulverized coal obtained by the mill is fed to the burners of the boiler by said primary recirculating exhaust gas;
    a secondary recirculation line through which another portion of the exhaust gas in recirculation is fed as secondary recirculating exhaust gas to a wind box of the boiler;
    an oxygen producer;
    a direct supply line through which a portion of oxygen produced by the oxygen producer is directly fed to the burners and a secondary oxygen mixing line through which another portion of oxygen produced by the oxygen producer is fed to said secondary recirculation line;
    a tertiary recirculation line branching from the secondary recirculation line between a flow rate regulator on the secondary recirculation line and the wind box into a plurality of branched recirculation lines to feed the plurality of the ports of said two-stage combustion port with a portion of the recirculating exhaust gas;
    a flow rate regulator arranged on the tertiary recirculation line;
    a flow rate individual regulator arranged on each of said branched recirculation lines;
    an oxygen supply line branching from a point upstream of the point branching into the secondary oxygen mixing line and the direct supply line into a plurality of branched oxygen supply lines to feed the plurality of the ports of said two-stage combustion port with oxygen;
    an oxygen flow rate regulator arranged on said oxygen supply line;
    an oxygen flow rate individual regulator arranged on each of said branched oxygen supply lines; and
    a control unit to collect data of oxygen densities of said oxygen supply line and said branched recirculation lines and regulate the flow rate regulator on the tertiary recirculation line, the flow rate individual regulators, the oxygen flow rate regulator and the oxygen flow rate individual regulators, wherein $NO_x$ density of the boiler is measured to adjust toward increasing an amount of the exhaust gas fed to the two-stage combustion port to thereby reduce an oxygen density to the two-stage combustion port when an entire $NO_x$ density is to be lowered with an amount of unburned combustibles in the exhaust gas allowable, and heat absorption of the boiler is controlled to adjust toward decreasing the amount of the exhaust gas fed to the two-stage combustion port to thereby increase the oxygen density to the two-stage combustion port when entire heat absorption of the boiler is to be raised or when the amount of the unburned combustibles in all of the exhaust gas is to be reduced.

4. The apparatus of claim 3, comprising a plurality of two-stage combustion ports arranged on the boiler and a plurality of branched oxygen supply lines for regulating the oxygen density for each of the two-stage combustion ports.

* * * * *